US 6,532,507 B1

(12) United States Patent
Falik et al.

(10) Patent No.: US 6,532,507 B1
(45) Date of Patent: Mar. 11, 2003

(54) DIGITAL SIGNAL PROCESSOR AND METHOD FOR PRIORITIZED ACCESS BY MULTIPLE CORE PROCESSORS TO SHARED DEVICE

(75) Inventors: Ohad Falik, Kfar Saba (IR); Subramanian Parameswaran, Mountain View, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/579,258

(22) Filed: May 25, 2000

Related U.S. Application Data

(60) Provisional application No. 60/137,129, filed on May 28, 1999.

(51) Int. Cl.$^7$ .............................................. G06F 13/00
(52) U.S. Cl. ........................ 710/107; 710/240; 710/17; 710/58; 710/108
(58) Field of Search ................................ 710/22, 23, 25, 710/28, 32, 34, 35, 45, 107, 113, 108, 117, 118, 119, 116, 124, 125, 17, 58–60, 240, 200

(56) References Cited

U.S. PATENT DOCUMENTS

| | | | | |
|---|---|---|---|---|
| 3,967,246 A | * | 6/1976 | House ......................... | 711/151 |
| 4,933,846 A | | 6/1990 | Humphrey et al. .......... | 364/200 |
| 4,964,034 A | * | 10/1990 | Jaskowiak ................... | 710/114 |
| 5,471,590 A | | 11/1995 | Melo et al. .................. | 395/288 |
| 5,524,235 A | | 6/1996 | Larson et al. ................ | 395/478 |
| 5,539,916 A | * | 7/1996 | Yamasaki et al. ............ | 710/22 |
| 5,611,075 A | | 3/1997 | Garde ........................ | 395/480 |
| 5,619,720 A | | 4/1997 | Garde et al. ................. | 395/800 |
| 5,634,076 A | | 5/1997 | Garde et al. ................. | 395/842 |
| 5,706,446 A | * | 1/1998 | Kalish et al. ................ | 710/113 |
| 5,752,272 A | * | 5/1998 | Tanabe ....................... | 711/171 |
| 5,872,939 A | | 2/1999 | Ramsey et al. .............. | 395/300 |
| 6,115,767 A | * | 9/2000 | Hashimoto et al. .......... | 710/107 |
| 6,269,418 B1 | * | 7/2001 | Nakamura ................... | 710/113 |
| 6,460,095 B1 | * | 10/2002 | Ueno et al. .................... | 710/52 |
| 6,463,482 B1 | * | 10/2002 | Yasuhara ...................... | 710/25 |

FOREIGN PATENT DOCUMENTS

| | | | |
|---|---|---|---|
| JP | 404163657 A | * | 6/1992 |
| JP | 406110815 A | * | 4/1994 |

* cited by examiner

*Primary Examiner*—Xuan M. Thai
(74) *Attorney, Agent, or Firm*—Girard & Equitz LLP

(57) ABSTRACT

A system and signal processing method, in which at least two processors have prioritized, shared access to one or more devices connected along a bus. In preferred embodiments, a fast processor is connected along a first bus, a slow processor and shared device are connected along a second bus, and a communication device is connected between the buses. The communication device is configured to provide the fast processor continuous access to the shared device (in response to grant of an access request by the fast processor) for a limited time that is longer than the time required for a single word transfer, but the slow processor must contend with the fast processor for access to the shared device each time after the slow processor completes a word transfer. Preferably, the communication device provides the fast processor continuous access to the shared device for up to a maximum number of word transfers in response to grant of one access request by the fast processor. Preferably, in response to grant of an access request by the fast processor, transfer of a word between the fast processor and a device is allowed, and then the fast processor is provided continuous access to the device for an additional time not less than a predetermined minimum time and not greater than a predetermined maximum time. The prioritized access technique improves the inter-processor data transfer throughput rate without unfairly depriving the slow processor of access to the shared device.

35 Claims, 2 Drawing Sheets

# DIGITAL SIGNAL PROCESSOR AND METHOD FOR PRIORITIZED ACCESS BY MULTIPLE CORE PROCESSORS TO SHARED DEVICE

CROSS-REFERENCE TO RELATED APPLICATION

This application claims the benefit of U.S. Provisional Application Ser. No. 60/137,129, filed May 28, 1999, entitled "Digital Signal Processor and Method for Prioritized Access by Multiple Core Processors to Shared Memory."

BACKGROUND OF THE INVENTION

1. Field of the Invention

The present invention relates to systems (preferably integrated circuits for digital signal processing) which include multiple core processors ("cores") connected along one or more buses, where the cores share at least one device (e.g., a memory or peripheral device), and to methods of operating such systems. Preferred embodiments of the invention are integrated circuits (capable of performing digital signal processing) which include two cores (each connected along a different bus; one operating at a higher clock rate than the other), a memory or other device (shared by the cores) connected along one bus, and a communication circuit (connected between the buses) configured to provide the faster core continuous access to the shared device for multiple transactions without causing the slower core or its peripherals to be starved.

2. Description of the Related Art

It is conventional to implement a digital signal processor (DSP) as an integrated circuit ("chip"). Many conventional DSP chips include a memory connected along a bus and multiple circuits (including one or more processors) connected along one or more buses, with all the circuits sharing access to the memory. For example, DSP chips (e.g., for wireless communication applications) often include multiple core processors (sometimes referred to herein as "cores") which all share access to a memory (or two or more memories) connected along a bus. Principal elements of one such DSP chip are shown in FIG. 1.

The portion of a DSP chip shown in FIG. 1 includes first core processor 1 (a microcontroller core), core bus controller (CBC) 8, and random access memory (RAM) 9, all connected along bus 2. The chip also includes second core processor 3 (a digital signal processor core) connected along bus 6, and bus interface controller (BIC) 5 connected between bus 6 and bus 4. Inter-core communication circuit (ICCU) 7 is connected between bus 2 and bus 4, and is configured to allow core 3 to read from and write to memory 9. Optionally, the system also includes a second inter-core communication circuit (identical to ICCU 7), and a second BIC (identical to BIC 5) and third core processor (identical to processor 3) connected along a third bus to the second ICCU. The second ICCU circuit is connected between bus 2 and the third bus, and is configured to allow the third core processor to read from and write to memory 9 (and to allow processor 1 to access any device connected along the third bus).

Each of memories 9 and 10 is shared by cores 1 and 3. In typical implementations, ICCU 7 implements requests by core 3 for reads and writes to shared memory 9 using a hold and hold acknowledge (HOLD-HLDA) protocol. For example, when core 3 initiates an access to memory 9 (in connection with which core 3 asserts an address through bus interface controller 5 over bus 4 to ICCU 7), ICCU 7 receives the address and in response, asserts a bus master request (a Hold signal) to CBC 8. When CBC 8 grants the request for control of bus 2 (asserting a Hold Acknowledge signal to ICCU 7), ICCU 7 causes the requested access to memory 9 to be performed (with ICCU 7 translating the address asserted by core 3 to an address within the address space of core 1). While ICCU 7 waits for a bus grant signal from CBC 8 (for access to bus 2), it stalls core 3 by sending a "Wait" signal to BIC 5.

Peripheral bus controller (PBC) 40 is connected between bus 2 and bus 44. UART 41, infra-red device interface (IRDA) 42, and universal serial bus (USB) device 42 are connected along bus 44. In response to a request by processor 3 for access to bus 2 to accomplish an access of any peripheral device on bus 44, ICCU 7 operates in the same manner as it does in response to a request by processor 3 for access to bus 2 to accomplish an access of memory 9.

Core 1 can access memory 9 (and core 3 can access memory 10) without employing ICCU 7. However, when core 1 initiates an access to memory 10 (connected along bus 4), ICCU 7 implements the access in essentially the same way that ICCU 7 implements an access by core 3 to a memory (e.g., memory 9) connected along bus 2. ICCU 7 receives the address (from core 1) and in response ICCU 7 requests access to bus 4. When bus interface controller 5 grants the request for control of bus 4, ICCU 7 enables performance of the requested access to memory 10 (with ICCU 7 translating the address asserted by core 1 to an address within the address space of core 3).

It is conventional to release bus 2 after core 3 (or 1) has completed an access to memory 9 (e.g., after core 1 or 3 has read or written a data word to the memory), and to release bus 4 after core 1 (or 3) has completed an access to a memory (or another device) connected along bus 4. When the bus is released, both cores must contend (according to a conventional arbitration scheme) for the next access to the bus. However, the overall rate of memory accesses (the number of accesses to the shared memory per unit time, averaged over time) is slowed because of the need for both cores to endure many wait states for bus arbitration. The inventors have recognized that the overall rate of memory accesses (averaged over time) is especially low (relative to the optimally obtainable rate) in implementations in which one core (e.g., core 3) is significantly faster than the other core.

Other conventional schemes in which two cores share access to a memory employ a "parking" technique in which one of the cores has access to the memory by default. In other conventional schemes of this type, the last core to access the memory retains access by default. Both of these approaches have the problem that when both cores seek access, latency is introduced (due to the requirement for arbitration for access after every transaction) which forces the cores to endure wait states.

In some conventional implementations of FIG. 1 (or other integrated circuits in which two cores share access to a memory), one or both cores can request (and be granted) "continuous" access to a shared memory. For example, in one such implementation of FIG. 1, one of the cores (core 3) can request "continuous" control of bus 4 and thus "continuous" access to shared memory 10. ICCU 7 and controller 5 are configured to respond to such request by granting core 3 the requested continuous control of bus 4 (so that core 1 cannot contend with core 3 for access to bus 4) until core 3 asserts a control bit (or other control signal) to ICCU 7 which relinquishes control over bus 4. However, in many applications, such an implementation can unfairly "starve" the slower core (e.g., core 1) which does not have continuous access to the shared memory (i.e., unfairly deprives the slower core of access to the shared memory for long periods of time). Moreover (in the example), since core 1 and DMA controller 11 share bus 2, the DMA controller is starved (as well as core 1) when core 1 is starved. Also, the core (e.g., core 1) being starved cannot service peripherals for extended periods of time (causing buffer overflows in the peripherals, expired timers, and so on).

SUMMARY OF THE INVENTION

In preferred embodiments, the invention is system (preferably implemented as an integrated circuit, and capable of performing digital signal processing) including at least two processors (preferably core processors) and at least one device shared by the processors. Each processor is connected along a different bus, and at least one of the processors (the "fast" processor) operates in response to a faster (higher frequency) clock than does another one of the processors (the "slow" processor). Each shared device is connected along a first one of the buses (the "first" bus), and the system also includes a communication device (a circuit) connected between the buses. The communication device is configured to provide the fast processor continuous access to the first bus (in response to grant of a request by the fast processor for access thereto) for a limited time interval which is longer than the time required for a single word transfer between the fast processor and a shared device connected along the first bus. In contrast, the slow processor must contend with the fast processor for access to the first bus each time after the slow processor completes a word transfer to or from a shared device connected along the first bus. Each shared device can be a memory or a peripheral device. The access arbitration scheme applies to the first bus. Once either processor acquires the first bus, it can access any shared device connected along the first bus.

Preferably, the communication device is configured to provide the fast processor continuous access to the first bus for N word transfers (in response to grant of a single request by the fast processor for access to a shared device connected along the first bus), where N is a number greater than one, to optimize bus access for a sequence of single shared device accesses with time proximity. Preferably this is accomplished in the following manner: (a) after the fast processor accomplishes one word transfer (either a read or write), the communication device continues to provide the fast processor access to the first bus for an additional time (e.g., a number, P, of the fast processor's clock cycles); (b) if the fast processor initiates another word transfer during the additional predetermined time, the communication device continues to provide the fast processor access to the first bus, without any arbitration latency; and (c) steps (a) and (b) are repeated until the fast processor has completed the maximum number (N) of word transfers. The parameter N depends on the clock frequencies of the processors, the service time period for peripherals connected to the first bus, and the access profile of the fast processor based on the application. The parameter P depends on the clock frequencies of the processors, the number of clock cycles required for the fast processor to initiate transactions, and some fixed number of "guard band" cycles. For maximum flexibility, each of the parameters N and P is programmable by the system user.

If the fast processor fails to initiate a word transfer during any performance of step (a), or after the fast processor completes the maximum number (N) of word transfers, the communication device releases the bus thereby allowing the slower processor to request access to the bus.

Alternatively, the communication device is configured to provide the fast processor continuous access to the first bus for some predetermined maximum number, M, of the fast processor's clock cycles (in response to grant of a single request by the fast processor for access to a shared device connected along the first bus), for example in the following manner: (a) after the fast processor accomplishes one word transfer, the communication device continues to provide the fast processor access to the first bus for an additional time (e.g., a number, P, of the fast processor's clock cycles, where P is less than M); (b) if the fast processor initiates another word transfer during the additional predetermined time, the communication device continues to provide the fast processor access to the first bus, without any arbitration latency; and (c) steps (a) and (b) are repeated until the maximum number (M) of clock cycles has elapsed.

The invention improves the throughput rate for interprocessor data transfer (writing by one processor to a shared device followed by reading of the so-written data by the other processor) when interleaved read/write accesses to the shared device are initiated by either processor, without unfairly depriving the slow processor (or other users of the first bus) of access to the first bus.

Another aspect of the invention is a method for controlling access by a first processor and a second processor to a shared device (e.g., a memory or peripheral device), wherein the first processor operates in response to a clock having a first frequency and the second processor operates in response to a second clock having a frequency lower than the first frequency, the method including the steps of:

(a) in response to grant of a request by the first processor for access to the shared device, allowing transfer of a word between the first processor and the shared device, and then providing the first processor continuous access to the shared device for an additional limited time, wherein the additional limited time is not less than a predetermined minimum time and not greater than a predetermined maximum time; and (b) in response to a request by the second processor for access to the shared device, allowing transfer of a word between the second processor and the shared device, but then requiring the second processor to contend with the first processor for access to the shared device for a subsequent word transfer.

The access arbitration scheme applies to a bus along which the shared device is connected. Once either processor acquires the bus, it can access any shared device connected along the bus. In some embodiments, the predetermined maximum time is the time interval required for continuous transfer of N words between the first processor and the shared device. The parameter N depends on the clock frequencies of the processors, the service time period for peripherals connected to the first bus, and the access profile of the first processor based on the application.

Preferably, step (a) includes the steps of: (c) after the first processor accomplishes a word transfer, continuing to provide the first processor access to the bus (along which the shared device is connected) for an additional time (e.g., a number, P, of the first processor's clock cycles); (d) if the first processor initiates another word transfer during the additional time, continuing to provide the first processor access to the bus, without any arbitration latency; and (e) repeating steps (c) and (d) until the predetermined maximum time has elapsed. The parameter P depends on the clock frequencies of the processors, the number of clock cycles required for the first processor to initiate transactions, and some fixed number of "guard band" cycles. For maximum flexibility, each of the parameters N and P is programmable by the system user.

In performing step (e), steps (c) and (d) are preferably repeated until the first processor has completed the predetermined maximum number (N) of word transfers. If the first processor fails to initiate a word transfer during any performance of step (c), or after the predetermined maximum time has elapsed (e.g., after the first processor completes the predetermined maximum number (N) of word transfers), the continuous access by the first processor to the bus terminates (so that both processors must contend for the next access to the bus).

DETAILED DESCRIPTION OF THE PREFERRED EMBODIMENTS

In a class of embodiments, the invention is an integrated circuit (preferably capable of performing digital signal processing), which includes two processors (core processors in preferred embodiments) and a memory shared by the processors. An integrated circuit having the elements shown in FIG. 2 is one such embodiment. The FIG. 2 circuit differs from the conventional chip of FIG. 1 only in that it includes inter-core communication circuit (ICCU) 17 which is configured in accordance with the invention rather than conventional ICCU 7 of FIG. 1, and in that core processor 3 (sometimes referred to as the "fast" processor) operates in response to a faster (higher frequency) clock than does core processor 1 (sometimes referred to as the "slow" processor). In a typical implementation, the clock of core processor 3 has frequency five times greater than that of core processor 1's clock.

Figure 1:
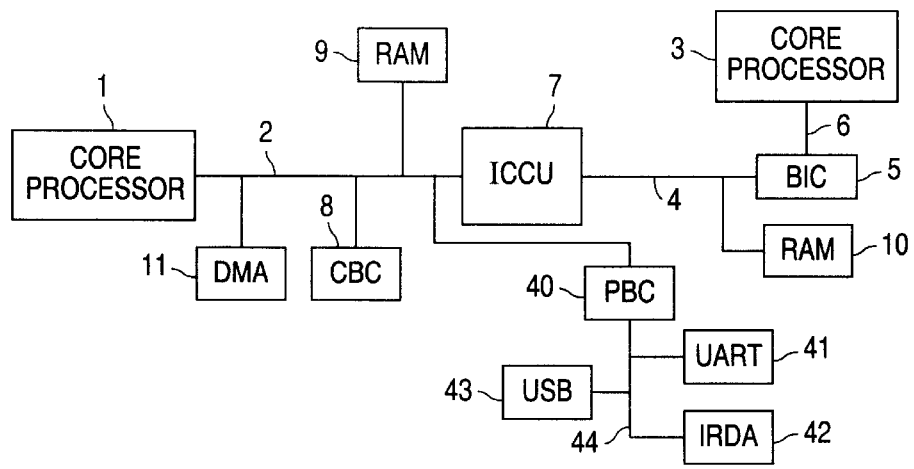
FIG. 1 is a block diagram of elements of a conventional digital signal processor which is implemented as an integrated circuit.
Figure 2:
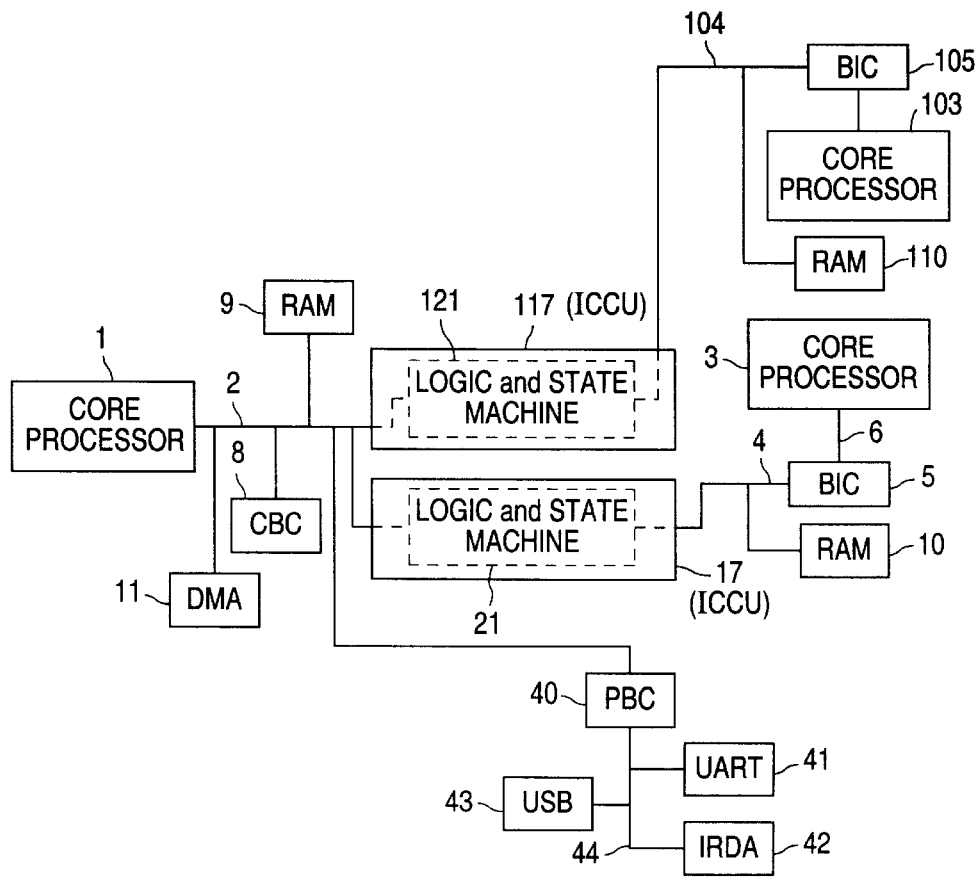
FIG. 2 is a block diagram of elements of a digital signal processor which is implemented as an integrated circuit and configured in accordance with the invention.

Like ICCU 7 of FIG. 1, ICCU 17 of FIG. 2 is connected between bus 2 and bus 4 (with a first terminal coupled to bus 2 and a second terminal coupled to bus 4), and is configured to allow core 3 to read from and write to memory 9. ICCU 17 is identical to ICCU 7 of FIG. 1 except in the respect that ICCU 17 includes access arbitration logic and state machine circuitry (identified by reference numeral 21 and connected between buses 2 and 4) which is configured to cause ICCU 17 to operate in accordance with the invention (in response to grant (by CBC 8) of a request by processor 3 for access to bus 2 and thus to memory 9) as described below. ICCU 17 of FIG. 2 operates in the same way in response to grant (by BIC 5) of a request by processor 1 for access to bus 4 and thus to memory 10) as does ICCU 7 of FIG. 1.

The FIG. 2 system also includes ICCU 117, processor 103, bus 104, BIC 105, and random access memory 110, which are connected as shown, and are identical to ICCU 17, processor 3, bus 4, BIC 5, and random access memory 10, respectively. ICCU 117 includes arbitration logic and state machine circuitry 121, which is identical to arbitration logic and state machine circuitry 21 of ICCU 17. Processor 103 is a fast processor, and typically has the same clock frequency as does fast processor 3. Arbitration logic and state machine circuitry 121 is configured to respond in the same manner (to be explained below) to a request by processor 103 for access to shared memory 9, as does arbitration logic and state machine circuitry 21 to a request by fast processor 3 for access to shared memory 9. Arbitration logic and state machine circuitry 121 and BIC 105 are also configured to respond in the same manner to a request by processor 1 for access to memory 110, as do arbitration logic and state machine circuitry 21 and BIC 5 to a request by processor 1 for access to memory 10.

Access arbitration logic and state machine circuitry 21 is configured so that ICCU 17 provides fast processor 3 continuous access to shared memory 9 (in response to a request by processor 3 for access to memory 9) for a limited time interval which is longer than the time required for a single word transfer between processor 3 and memory 9. In contrast, slow processor 1 must contend with fast processor 3 for access to memory 9 each time after slow processor 1 completes a word transfer to or from memory 9. Preferably, ICCU 17 is configured to provide fast processor 3 continuous access to memory 9 for up to a maximum of N word transfers (in response to a single request by processor 3 for access to memory 9), where N is a predetermined number greater than one, in the following manner:

(a) after processor 3 accomplishes a word transfer (either a read from memory 9 or a write to memory 9), ICCU 17 continues to provide processor 3 access to bus 2 (and thus to memory 9) for an additional predetermined time (preferably a predetermined number, P, of processor 3's clock cycles);

(b) if processor 3 initiates another word transfer to or from memory 9 during the additional predetermined time, ICCU 17 continues to provide processor 3 access to bus 2 without any arbitration latency; and (c) steps (a) and (b) are repeated until processor 3 has completed the predetermined maximum number (N) of word transfers.

If processor 3 fails to initiate a word transfer during any repetition of step (a), ICCU 17 releases bus 2 thus causing both processors 1 and 3 to contend for the next access to memory 9. Similarly, after processor 3 completes the predetermined maximum number (N) of word transfers to or from memory 9, ICCU 17 releases bus 2 thus causing both processors 1 and 3 to contend for the next access to memory 9.

Alternatively, ICCU 17 (including circuitry 21) is configured to provide fast processor 3 continuous access to memory 9 for some predetermined maximum number, M, of processor 3's clock cycles (in response to grant of a single request by processor 3 for access to shared memory 9), or until the earlier of the following two events occurs: some predetermined maximum number, M, of processor 3's clock cycles has elapsed (following grant of a single request by processor 3 for access to shared memory 9); and processor 3 has completed some predetermined maximum number, N, of word transfers (following grant of a single request by processor 3 for access to memory 9). For example, this can be implemented in the following manner: (a) after processor 3 accomplishes one word transfer to or from memory 9, ICCU 17 continues to provide processor 3 access to bus 2 (and thus to memory 9) for an additional predetermined time (preferably a predetermined number, P, of processor 3's clock cycles, where P is less than M); (b) if processor 3 initiates another word transfer to or from memory 9 during the additional predetermined time, ICCU 17 continues to provide processor 3 access to bus 2 without any arbitration latency; and (c) steps (a) and (b) are repeated until the predetermined maximum number (M) of clock cycles has elapsed. Alternatively, the following step replaces step (c) of the previous sentence: steps (a) and (b) are repeated until the occurrence of the earlier of the following two events: the predetermined maximum number (M) of clock cycles has elapsed, or processor 3 has completed a predetermined maximum number (N) of word transfers.

Alternatively, ICCU 17 (including circuitry 21) is configured to provide fast processor 3 continuous access to memory 9 for some predetermined maximum number, M, of processor 3's clock cycles (in response to grant of a single request by processor 3 for access to shared memory 9).

Figure 3:
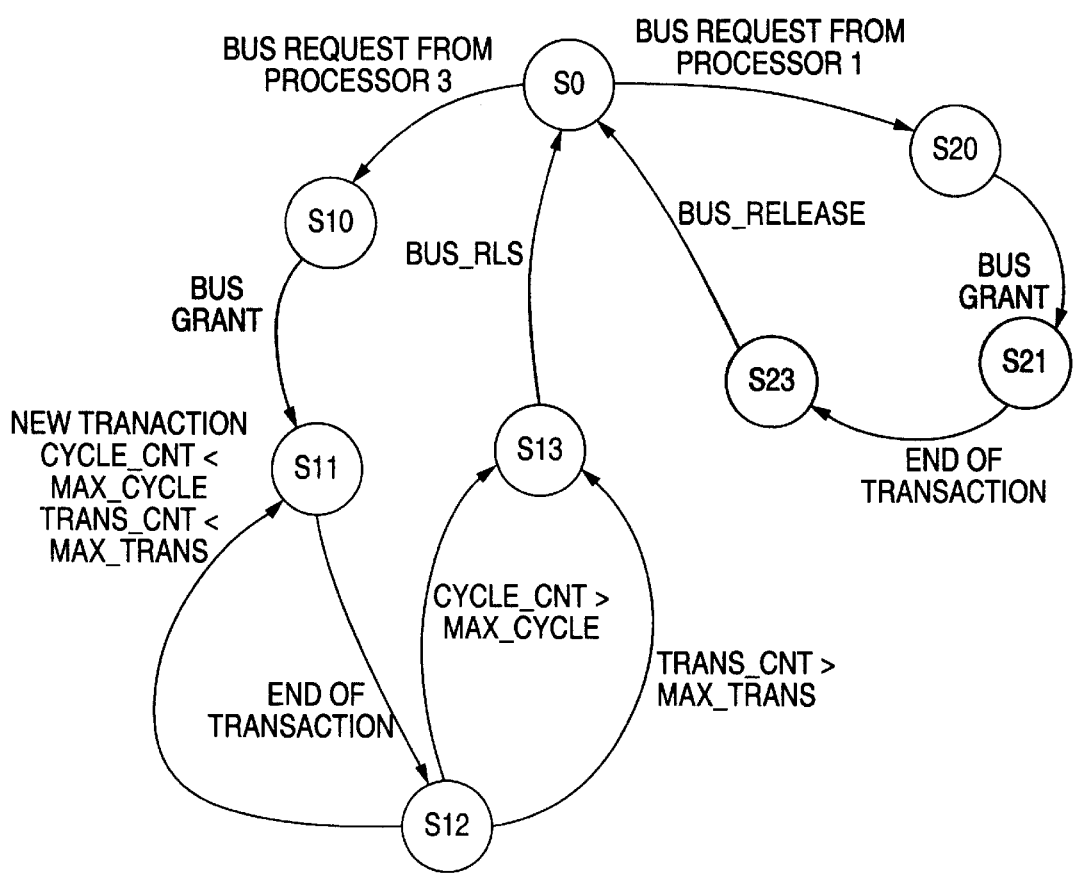
FIG. 3 is a state diagram of one implementation of arbitration logic and state machine circuitry 21 of FIG. 2.

FIG. 3 is a state diagram of one implementation of arbitration logic and state machine circuitry 21 of FIG. 2. FIG. 3 contemplates that circuitry 21 is initially in state S0. Circuitry 21 enters state S10 in response to a request by processor 3 for access to memory 9, and enters state S11 upon granting such request. When processor 3 accomplishes a word transfer (as indicated by circuitry 21's receipt of an "End of Transaction" signal, as identified in FIG. 3), circuitry 21 enters state S12. If circuitry 21 (in state S12) receives another request by processor 3 for access to memory 9 within a predetermined amount of time after receiving the most recent End of Transaction signal (i.e., if its clock cycle count "CYCLE_CNT" is less than a predetermined maximum number of cycles "MAXCYCLES" when it receives the additional request of processor 3), and if circuitry 21 determines that it has received less than a predetermined number of "End of Transaction" signals since it entered state S12 (i.e., if its transaction count "TRANS_CNT" is less than a predetermined maximum number of transactions "MAX_TRANS"), it responds to the additional request of processor 3 by returning to state S11 (so that processor 3 continues to have access to memory 9). If circuitry 21 (in state S12) determines that at least a predetermined amount of time has elapsed (without receipt of an additional request by processor 3) since circuitry 21 received the most recent End of Transaction signal (i.e., if clock cycle count "CYCLE_CNT" is equal to or greater than "MAXCYCLES"), or if it determines that it has received at least a predetermined number of "End of Transaction" signals since it entered state S12 (i.e., if transaction count "TRANS_CNT is equal to or greater than "MAX_TRANS"), it enters state S13 (in which it releases the bus), and then state S0 (in which both of processors 1 and 3 must contend for the next access to memory 9).

Circuitry 21 (in state S0) enters state S20 in response to a request by processor 1 for access to memory 9, and enters state S21 upon granting such request. When processor 1 accomplishes a word transfer (as indicated by circuitry 21's receipt of an "End of Transaction" signal, as identified in FIG. 3), circuitry 21 enters state S23 (in which it releases the bus), followed by state S0 (in which both of processors 1 and 3 must contend for the next access to memory 9).

Circuitry 21 arbitrates only when in state S0, and only in the event that it receives simultaneous requests by processors 1 and 3 for access to memory 9 while in state S0. Thus, latency introduced by arbitration (for access to memory 9) can occur only when processor 3 requests an initial transaction (i.e., when processor 3 requests a transaction at a time when circuitry 21 is in state S0).

In alternative embodiments, the fast and slow processors, shared memory, and communication device (e.g., ICCU) of the invention are not all implemented as elements of a single integrated circuit. For example, in a variation on the FIG. 2 embodiment, all elements except processor 3, memory 10, bus 6, controller 5, and bus 4 are implemented as elements of a first integrated circuit. Processor 3, memory 10, bus 6, and controller 5 are elements of a second integrated circuit, and bus 4 connects the second integrated circuit with the first integrated circuit. Numerous other variations are possible.

In the FIG. 2 embodiment, fast processor 3 is connected along bus 6, and slow processor 1 and shared memory 9 are connected along bus 2. A second shared memory (random access memory 10) is connected along bus 4. ICCU 17 is configured to allow slow processor 1 access to bus 4 (and thus to memory 10) in a conventional manner. After each access by processor 1 to bus 4 (and thus to memory 10), processors 3 and 1 must contend in a conventional manner for the next access to memory 10. When processor 1 obtains control over bus 4 (so that it can implement a word transfer to or from memory 10), ICCU 17 causes processor 1 to release bus 4 after completing a single word transfer to or from memory 10. After such transfer, processors 3 and 1 must contend for the next access to memory 10.

In some implementations, it is contemplated that processors 1 and 3 can communicate with each other as follows: processor 1 can write to a section of shared memory 9 allocated to processor 3 (so that processor 3 can later read the data), and processor 3 can write to another section of shared memory 9 allocated to processor 1 (so that processor 1 can later read such data).

In another class of embodiments, the invention is a method for controlling access by a first processor and a second processor to a shared device (e.g., a memory or peripheral device). Each processor can be a core processor (as in FIG. 2), but alternatively it can be another type of processor. It is assumed that the first processor (sometimes referred to as the "fast" processor) operates in response to a clock having a first frequency and that the second processor (sometimes referred to as the "slow" processor) operates in response to a second clock having a frequency lower than the first frequency. The method including the steps of:

(a) in response to grant of a request by the first processor for access to the shared device, allowing transfer of a word between the first processor and the shared device, and then providing the first processor continuous access to the shared device for an additional limited time, wherein the additional limited time is not less than a predetermined minimum time and not greater than a predetermined maximum time; and (b) in response to a request by the second processor for access to the shared device, allowing transfer of a word between the second processor and the shared device, but then requiring the second processor to contend with the first processor for access to the shared device for a subsequent word transfer.

The access arbitration scheme applies to a bus along which the shared device is connected. Once either processor acquires the bus, it can access any shared device connected along the bus. In some embodiments, the predetermined maximum time is the time interval required for continuous transfer of N words between the first processor and the shared device. The parameter N depends on the clock frequencies of the processors, the service time period for peripherals connected to the first bus, and the access profile of the first processor based on the application.

Preferably, step (a) includes the steps of: (c) after the first processor accomplishes a word transfer, continuing to provide the first processor access to the bus (along which the shared device is connected) for an additional time (e.g., a number, P, of the first processor's clock cycles); (d) if the first processor initiates another word transfer during the additional time, continuing to provide the first processor access to the bus, without any arbitration latency; and (e) repeating steps (c) and (d) until the predetermined maximum time has elapsed. Typically, the second processor is connected along the same bus as is the shared device, and the first processor is connected along another bus. The parameter P depends on the clock frequencies of the processors, the number of clock cycles required for the first processor to initiate transactions, and some fixed number of "guard band" cycles. For maximum flexibility, each of the parameters N and P is programmable by the system user.

In performing step (e), steps (c) and (d) are preferably repeated until the first processor has completed the predetermined maximum number (N) of word transfers. If the first processor fails to initiate a word transfer during any performance of step (c), or after the predetermined maximum time has elapsed (e.g., after the first processor completes the predetermined maximum number (N) of word transfers), the continuous access by the first processor to the bus terminates (so that both processors must contend for the next access to the bus).

In preferred implementations, the fast processor is connected along a first bus, and the slow processor and a shared memory are connected along a second bus. In response to a request by the fast processor for access to the memory, the fast processor is granted control of the second bus for a time sufficient for transfer of a word between the fast processor and the memory, and the fast processor then continues to be granted control over the second bus (and thus continues to have access to the memory) for the noted additional limited time (the additional limited time being not less than a predetermined minimum time and not greater than a predetermined maximum time). If the fast processor fails to initiate the initial word transfer, if the fast processor fails to initiate an additional word transfer during the additional limited time, or after the predetermined maximum time has elapsed (e.g., after the fast processor completes a predetermined maximum number of word transfers), the continuous access by the fast processor to the memory terminates (so that both processors must contend for the next access to the memory).

In preferred embodiments of the inventive method, the fast processor, slow processor, and memory are all implemented as elements of a single integrated circuit.

In some embodiments, one or more shared peripheral devices are connected along the same bus as are one or more shared memories (e.g., memory 9). For example, as shown in both FIG. 1 and FIG. 2, peripheral bus-controller (PBC) 40 is connected along the same bus (bus 2) as is shared memory 9, PBC 40 is connected between bus 2 and bus 44, and several peripheral devices (UART 41, infra-red device interface (IRDA) 42, and universal serial bus (USB) device 42) are connected along bus 44. For purposes of the claims, PBC 40 (as well as devices 41, 42, and 43) is considered to be peripheral device. In the FIG. 2 embodiment of the invention, access arbitration logic and state machine circuitry 21 within ICCU 17 is configured to cause ICCU 17 to operate in accordance with the invention (in response to grant of a request by processor 3 for access to bus 2 to accomplish an access of any peripheral device on bus 44) in the same manner described above in which ICCU 17 responds to grant of a request by processor 3 for access to bus 2 to accomplish an access of memory 9. Specifically, ICCU 17 is configured to provide fast processor 3 continuous access to any peripheral device connected along bus 44 (in response grant by CBC 8 of a request by fast processor 3 for access to bus 2) for a limited time interval which is longer than the time required for a single word transfer to or from processor 3. In response to such a request by processor 3 for access, ICCU 17 asserts a bus master request (a Hold signal) to CBC 8. When CBC 8 grants the request for control of bus 2 (asserting a Hold Acknowledge signal to ICCU 17), ICCU 17 not only facilitates the requested access (e.g., transfer of a word between processor 3 and one of the peripheral devices connected along bus 44) but ICCU 17 provides processor 3 continuous access to bus 2 for a limited time interval longer than the time required for the single word transfer. In this way, the invention improves the rate of data transfer between processor 3 and the peripheral devices connected along bus 44, without unfairly depriving slow processor 1 of access to bus 2.

In contrast, ICCU 17 is implemented so that slow processor 1 must contend with processor 3 for access to bus 4 each time after slow processor 1 completes a word transfer to or from any device connected along bus 4 (including memory 10). Slow processor 1 must also contend with processor 3 for access to bus 2 each time after slow processor 1 completes a word transfer to or from any device connected along bus 2.

Preferably, ICCU 17 is configured to provide fast processor 3 continuous access to bus 2 (and thus to the shared peripherals connected, through PBC 40, to bus 2) for N word transfers in response to grant of a single access request (by fast processor 3), where N is a number greater than one, to optimize bus access for a sequence of peripheral device accesses with time proximity. Preferably this is accomplished in the following manner: (a) after fast processor 3 completes a word transfer to or from one of the peripheral devices connected along bus 44, ICCU 17 continues to provide fast processor 3 access to bus 2 for an additional time (e.g., a number, P, of the fast processor's clock cycles); (b) if fast processor 3 initiates another word transfer during the additional time, ICCU 17 continues to provide fast processor 3 access to bus 2 without any arbitration latency; and (c) steps (a) and (b) are repeated until fast processor 3 has completed the maximum number (N) of word transfers. If processor 3 fails to initiate a word transfer during any repetition of step (a), or after processor 3 completes the maximum number of word transfers, ICCU 17 releases bus 2 thereby allowing slow processor 1 to request access to bus 2. The parameter N depends on the clock frequencies of processors 1 and 3, the service time period for peripherals connected to bus 2 and bus 44, and the access profile of fast processor 3 based on the application. The parameter P depends on the clock frequencies of processors 1 and 3, the number of clock cycles required for fast processor 3 to initiate transactions, and some fixed number of "guard band" cycles. For maximum flexibility, ICCU 17 is configured so that each of the parameters N and P is programmable by the system user.

Another aspect of the invention is a method for controlling access by a first processor and a second processor to a shared peripheral device, wherein the first processor operates in response to a clock having a first frequency and the second processor operates in response to a second clock having a frequency lower than the first frequency, the method including the steps of:

(a) in response to grant of a request by the first processor for access to the peripheral device, allowing transfer of a word between the first processor and the peripheral device, and then providing the first processor continuous access to the peripheral device for an additional limited time, wherein the additional limited time is not less than a predetermined minimum time and not greater than a predetermined maximum time; and (b) in response to grant of a request by the second processor for access to the peripheral device, allowing transfer of a word between the second processor and the peripheral device, but then requiring the second processor to contend with the first processor for access to the peripheral device for a subsequent word transfer.

Typically, the first processor is connected along a first bus, each of the second processor and the peripheral device is connected along a second bus, and the request by the first processor for access to the peripheral device is (or includes) a request for access to the second bus. Step (a) preferably includes the steps of: (c) after the first processor accomplishes a word transfer, continuing to provide the first processor access to the peripheral device for an additional interval whose duration is the predetermined minimum time; (d) if the first processor initiates an additional word transfer during the additional interval, continuing to provide the first processor access to the peripheral device until the additional word transfer is completed; and (e) repeating steps (c) and (d) until the predetermined maximum time has elapsed.

Although the invention has been described in connection with specific preferred embodiments, it should be understood that the invention as claimed should not be unduly limited to such specific embodiments.

What is claimed is:

1. A system, including:

a first bus;

a second bus;

a first processor connected along the first bus, wherein the first processor operates in response to a first clock having a first frequency;

a device connected along the second bus;

a second processor connected along the second bus, wherein the second processor operates in response to a second clock having a second frequency lower than the first frequency, and wherein the second processor is configured to contend for access to the second bus and thus for access to the device connected along the second bus; and a communication device connected between the first bus and the second bus, wherein the communication device is configured to provide the first processor continuous access to the second bus for a limited time interval in response to grant of a request by the first processor for access to the second bus, a first time is required for a word transfer between the first processor and the device connected along the second bus, the limited time interval is longer than the first time, and the communication device is configured to continue to provide the first processor continuous access to the second bus, after initial transfer of a word is accomplished between the first processor and the device, for an additional time interval that does not exceed a predetermined maximum time.

2. The system of claim 1, wherein the device connected along the second bus is a memory.

3. The system of claim 1, wherein the device connected along the second bus is a peripheral device.

4. The system of claim 1, wherein the predetermined maximum time is a predetermined maximum number of word transfers, where the predetermined maximum number is greater than one.

5. The system of claim 4, wherein the communication device is configured to continue to provide the first processor access to the second bus, after said initial transfer of a word between the first processor and the device, for an additional predetermined time, and the communication device is configured to continue to provide the first processor access to the second bus, if the first processor initiates a transfer of an additional word between the first processor and the device during the additional predetermined time, until the transfer of the additional word is completed provided that the first processor has not completed the maximum number of word transfers.

6. The system of claim 5, wherein the communication device is configured to release the second bus, thereby causing both the first processor and the second processor to contend for a subsequent access to the second bus, after the first processor has completed the maximum number of word transfers.

7. The system of claim 5, wherein the communication device is configured to release the second bus, thereby causing both the first processor and the second processor to contend for a subsequent access to the second bus, if the first processor fails to initiate a word transfer during said additional predetermined time.

8. The system of claim 5, wherein the additional predetermined time is a predetermined number of cycles of the first clock.

9. The system of claim 1, wherein the system is an integrated circuit, the second processor is a core processor capable of digital signal processing, and the first processor is another core processor.

10. The system of claim 1, wherein the predetermined maximum time is a predetermined number of cycles of the first clock.

11. The system of claim 10, wherein the communication device is configured to release the second bus, thereby causing both the first processor and the second processor to contend for a subsequent access to the second bus, when the predetermined number of cycles of the first clock has elapsed.

12. The system of claim 1, wherein the communication device is configured to continue to provide the first processor access to the second bus, after initial transfer of a word is accomplished between the first processor and the device, for an additional predetermined time, and the communication device is configured to continue to provide the first processor access to the second bus, if the first processor initiates a transfer of an additional word between the first processor and the device during the additional predetermined time, until the transfer of the additional word is completed, provided that a predetermined number of cycles of the first clock has not elapsed since the grant of the request by the first processor for access to the second bus.

13. The system of claim 1, wherein the predetermined maximum time is a predetermined maximum number of word transfers, or a predetermined number of cycles of the first clock, whichever is less, where the maximum number of word transfers is a number greater than one, wherein the communication device is configured to continue to provide the first processor access to the second bus, after initial transfer of a word is accomplished between the first processor and the device, for an additional predetermined time, and the communication device is configured to continue to provide the first processor access to the second bus, if the first processor initiates a transfer of an additional word between the first processor and the device during the additional predetermined time, until the transfer of the additional word is completed, but only if said transfer of the additional word is completed before the first processor has completed the maximum number of word transfers and before the predetermined number of cycles of the first clock has elapsed following said initial transfer of a word between the first processor and the device.

14. The system of claim 1, also including:

a third bus;

a third processor connected along the third bus, wherein the first processor operates in response to a third clock having a third frequency, wherein the third frequency is greater than second frequency; and a second communication device connected between the second bus and the third bus, wherein the second communication device is configured to provide the third processor continuous access to the second bus for a second limited time interval in response to grant of a request by the third processor for access to the second bus, a third time is required for a word transfer between the third processor and the device connected along the second bus, the second limited time interval is longer than the third time, and the second communication device is configured to continue to provide the third processor continuous access to the second bus, after initial transfer of a word is accomplished between the third processor and the device, for a second additional time interval that does not exceed a second predetermined maximum time.

15. The system of claim 14, wherein the second predetermined maximum time is that required for the system to accomplish a predetermined number of word transfers between the third processor and the device connected along the second bus, where the predetermined number of word transfers is greater than one.

16. The system of claim 14, wherein the second predetermined maximum time is a predetermined number of cycles of the third clock.

17. A method for controlling access by a first processor and a second processor to a shared device, wherein the first processor operates in response to a first clock having a first frequency and the second processor operates in response to a second clock having a frequency lower than the first frequency, the method including the steps of:

(a) in response to grant of a request by the first processor for access to the device, allowing transfer of a word between the first processor and the device, and then providing the first processor continuous access to the device for an additional limited time, wherein the additional limited time is not less than a predetermined minimum time and not greater than a predetermined maximum time; and (b) in response to grant of a request by the second processor for access to the device, allowing transfer of a word between the second processor and the device, but then requiring the second processor to contend with the first processor for access to the device for a subsequent word transfer.

18. The method of claim 17, wherein the shared device is a peripheral device, and step (a) includes the steps of:

(c) after the first processor accomplishes a word transfer, continuing to provide the first processor access to the peripheral device for an additional interval whose duration is the predetermined minimum time;

(d) if the first processor initiates an additional word transfer during the additional interval, continuing to provide the first processor access to the peripheral device until the additional word transfer is completed; and (e) repeating steps (c) and (d) until the predetermined maximum time has elapsed.

19. The method of claim 18, wherein the additional interval is a predetermined number of cycles of the first clock.

20. The method of claim 18, wherein step (e) includes the steps of repeating steps (c) and (d) until the first processor has completed a predetermined maximum number of word transfers.

21. The method of claim 18, wherein step (e) includes the steps of repeating steps (c) and (d) until a predetermined number of cycles of the first clock have elapsed.

22. The method of claim 18, wherein step (e) includes the steps of repeating steps (c) and (d) until completion of a predetermined maximum number of word transfers by the first processor or elapse of a predetermined number of cycles of the first clock, whichever occurs first.

23. The method of claim 17, wherein the first processor is connected along a first bus, each of the second processor and the shared device is connected along a second bus, and step (a) includes the steps of:

(c) in response to grant of the request by the first processor, allowing access by the first processor to the second bus to accomplish said transfer of the word and then continuing to provide the first processor access to the second bus for an additional interval whose duration is the predetermined minimum time;

(d) if the first processor initiates an additional word transfer during the additional interval, continuing to provide the first processor access to the second bus until the additional word transfer is completed; and (e) repeating steps (c) and (d) until the predetermined maximum time has elapsed.

24. The method of claim 23, wherein step (e) includes the steps of repeating steps (c) and (d) until the first processor has completed a predetermined maximum number of word transfers.

25. The method of claim 23, wherein step (e) includes the steps of repeating steps (c) and (d) until a predetermined number of cycles of the first clock have elapsed.

26. The method of claim 17, wherein the shared device is a memory, and step (a) includes the steps of:

(c) after the first processor accomplishes a word transfer, continuing to provide the first processor access to the memory for an additional interval whose duration is the predetermined minimum time;

(d) if the first processor initiates an additional word transfer during the additional interval, continuing to provide the first processor access to the memory until the additional word transfer is completed; and (e) repeating steps (c) and (d) until the predetermined maximum time has elapsed.

27. The method of claim 26, wherein the additional interval is a predetermined number of cycles of the first clock.

28. The method of claim 26, wherein step (e) includes the steps of repeating steps (c) and (d) until the first processor has completed a predetermined maximum number of word transfers.

29. The method of claim 28, also including the step of:

terminating the continuous access by the first processor to the memory, thereby causing the first processor and the second processor to contend for a subsequent access to the memory, after the first processor has completed the predetermined maximum number of word transfers.

30. The method of claim 28, also including the step of terminating the continuous access by the first processor to the memory, thereby causing both the first processor and the second processor to contend for a subsequent access to the memory, if the first processor fails to initiate a word transfer during any performance of step (a).

31. The method of claim 26, wherein step (e) includes the steps of repeating steps (c) and (d) until a predetermined number of cycles of the first clock have elapsed.

32. A communication device for use in a system capable of performing processing, wherein the system includes at least a first bus and a second bus, a first processor connected along the first bus, a shared device connected along the second bus, and a second processor connected along the second bus, wherein the first processor operates in response to a first clock having a first frequency, the second processor operates in response to a second clock having a second frequency lower than the first frequency, and the second processor is configured to contend for access to the second bus and thus for access to the shared device, said communication device comprising:

a first terminal for coupling the communication device with the first bus;

a second terminal for coupling the communication device with the second bus; and circuitry, connected between the first terminal and the second terminal, and configured to provide the first processor continuous access to the second bus for a limited time interval in response to grant of a request by the first processor for access to the second bus, and to provide the first processor continuous access to the second bus, after initial transfer of a word is accomplished between the first processor and the shared device, for an additional time interval that does not exceed a predetermined maximum time, wherein a first time is required for a word transfer between the first processor and the shared device, and the limited time interval is longer than the first time.

33. The communication device of claim 32, wherein the predetermined maximum time is a maximum number of word transfers, where the maximum number of word transfers is a predetermined number greater than one.

34. The communication device of claim 33, wherein the circuitry is configured to continue to provide the first processor access to the second bus, after said initial transfer of a word is accomplished between the first processor and the shared device, for an additional predetermined time, and to continue to provide the first processor access to the second bus, if the first processor initiates a transfer of an additional word between the first processor and the shared device during the additional predetermined time, until the transfer of the additional word is completed provided that the first processor has not completed the maximum number of word transfers.

35. The communication device of claim 32, wherein the predetermined maximum time is a predetermined number of cycles of the first clock.

* * * * *